US011544234B2

(12) United States Patent
Rajadeva et al.

(10) Patent No.: US 11,544,234 B2
(45) Date of Patent: Jan. 3, 2023

(54) VIRTUALIZING SPECIFIC VALUES IN A GUEST CONFIGURATION BASED ON THE UNDERLYING HOST SYMBOL REPOSITORY

(71) Applicant: INTERNATIONAL BUSINESS MACHINES CORPORATION, Armonk, NY (US)

(72) Inventors: Ahilan Rajadeva, Monroe Township, NJ (US); Al Chakra, Apex, NC (US); Constantinos Kassimis, Cary, NC (US); Christopher Meyer, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 49 days.

(21) Appl. No.: 17/095,867

(22) Filed: Nov. 12, 2020

(65) Prior Publication Data

US 2022/0147496 A1 May 12, 2022

(51) Int. Cl.
*G06F 16/188* (2019.01)
*G06F 16/14* (2019.01)
*G06F 9/455* (2018.01)

(52) U.S. Cl.
CPC ........ *G06F 16/196* (2019.01); *G06F 9/45545* (2013.01); *G06F 9/45558* (2013.01);
(Continued)

(58) Field of Classification Search
CPC .... G06F 16/152; G06F 16/156; G06F 16/196; G06F 9/45545; G06F 9/45558; G06F 2009/45579
See application file for complete search history.

(56) References Cited

U.S. PATENT DOCUMENTS 7,099,866 B1 8/2006 Crosbie
7,577,686 B1 8/2009 Larkin
(Continued)

FOREIGN PATENT DOCUMENTS

CN 101430649 B 5/2009
CN 104572876 A 4/2015
(Continued)

OTHER PUBLICATIONS

Rajadeva, et al., "Virtualisieren Von Spezifischen Werten in Einer Gastkonfiguration Auf Grundlage Des Zugrundeliegenden Host-Symbol-Repository," Application and Drawings, Filed on Oct. 4, 2021, 22 Pages, Related US Patent Application Serial No. 10 2021 125 606.2.

(Continued)

*Primary Examiner* — Angelica Ruiz
(74) *Attorney, Agent, or Firm* — Teddi E. Maranzano

(57) ABSTRACT

A method, system, and computer program product are provided for virtualizing specific values in a guest configuration based on the underlying host symbol substitution values. A symbolic link located in a traditional file system in a virtual guest is opened. Each symbol is extracted from a symbol-based file located in a symbol-based file system. The symbol-based file is accessed through a symbolic link from the traditional file system. The virtual guest issues a privileged instruction to a hypervisor for each symbol in the symbol-based file to retrieve a substitution value from a symbol table that is stored in hypervisor storage. The substitution value for each symbol is returned to the virtual guest, and it replaces the symbol in the symbol-based file. In response to a file read request for the traditional file, the substitution value is retrieved from the symbol-based file using the symbolic link from the traditional file.

17 Claims, 5 Drawing Sheets

(52) U.S. Cl.
CPC ......... *G06F 16/152* (2019.01); *G06F 16/156* (2019.01); *G06F 2009/45579* (2013.01)

(56) References Cited

U.S. PATENT DOCUMENTS

| | | | |
|---|---|---|---|
| 7,580,826 B2 | 8/2009 | Vega | |
| 7,809,779 B2 | 10/2010 | Ahn | |
| 9,641,385 B1 | 5/2017 | Daniel | |
| 9,773,017 B2 | 9/2017 | Murphey | |
| 9,779,111 B2 | 10/2017 | Larimore | |
| 9,942,198 B2* | 4/2018 | Hoy | G06F 21/53 |
| 9,946,493 B2 | 4/2018 | Acedo | |
| 2004/0243544 A1* | 12/2004 | Hipp | G06F 9/50 |
| 2005/0198647 A1 | 9/2005 | Hipp | |
| 2005/0256914 A1 | 11/2005 | Bailey | |
| 2006/0090063 A1 | 4/2006 | Theis | |
| 2014/0082145 A1* | 3/2014 | Lacapra | H04L 67/02 709/219 |
| 2014/0156706 A1* | 6/2014 | Beecham | G06F 21/6218 707/783 |
| 2014/0310473 A1* | 10/2014 | Bilas | G06F 11/1435 711/129 |
| 2015/0242227 A1* | 8/2015 | Nair | G06F 12/00 718/1 |
| 2019/0028364 A1 | 1/2019 | Keller | |

FOREIGN PATENT DOCUMENTS

| | | |
|---|---|---|
| CN | 114489923 A | 5/2022 |
| DE | 102021125606 A1 | 5/2022 |
| JP | 2022077995 A | 5/2022 |

OTHER PUBLICATIONS

Rajadeva, et al., "Virtualizing Specific Values in a Guest Configuration Based on the Underlying Host Symbol Repository," Application and Drawings, Filed on Nov. 10, 2021, 21 Pages, Related US Patent Application Serial No. 2021-183084.

Rajadeva, et al., "Virtualizing Specific Values in a Guest Configuration Based on the Underlying Host Symbol Repository," Application and Drawings, Filed on Oct. 15, 2021, 21 Pages, Related US Patent Application Serial No. 202111201739.5.

Rajadeva, et al., "Virtualizing Specific Values in a Guest Configuration Based on the Underlying Host Symbol Repository," Application and Drawings, Filed on Oct. 21, 2021, 22 Pages, Related US Patent Application Serial No. 2115059.4.

Intellectual Property Office, "Combined Search and Examination Report under Sections 17 and 18(3)," Patents Directorate, Jul. 15, 2022, 10 pages, International Application No. 2115059.4.

* cited by examiner

VIRTUALIZING SPECIFIC VALUES IN A GUEST CONFIGURATION BASED ON THE UNDERLYING HOST SYMBOL REPOSITORY

BACKGROUND

Embodiments of the invention generally relate to computer systems, and more specifically to virtualization of files.

In a virtual guest environment, configuration information that is unique to the specific guest instance is saved in files at various locations inside the guest file system. These files are accessed and managed locally by the system and applications running inside the virtual guest instance. In an environment having a large number of virtual guest instances, these unique configuration files are managed individually for each of the virtual guest instances.

Remote file system capabilities can be leveraged to share file system contents across multiple systems via a network share. However, the sharing occurs on a directory or file system basis and is not available for an individual file, or at a field level. Network shares are also subject to the reliability and speed of the underlying network.

SUMMARY

Among other things, a method is provided. The method includes a virtual guest opening a real file, located in a traditional file system. Each symbol is extracted from a symbol-based file that is located in a symbol-based file system. The symbol-based file is accessed through a symbolic link in the traditional file system that links to the corresponding file in the symbol-based file system. The virtual guest issues a privileged instruction to a hypervisor for each symbol in the symbol-based file to retrieve a substitution value from a symbol table that is stored in hypervisor storage. The substitution value for each symbol is returned to the virtual guest as the virtual guest reads the symbol based file. In response to a file read request for the traditional file, the substitution value is retrieved from the symbol-based file using the symbolic link in the traditional file system.

Embodiments are further directed to computer systems and computer program products having substantially the same features as the above-described computer-implemented method.

Additional features and advantages are realized through the techniques described herein. Other embodiments and aspects are described in detail herein. For a better understanding, refer to the description and to the drawings.

BRIEF DESCRIPTION OF THE SEVERAL VIEWS OF THE DRAWINGS

The subject matter which is regarded as the present invention is particularly pointed out and distinctly claimed in the claims at the conclusion of the specification. The foregoing and other features and advantages are apparent from the following detailed description taken in conjunction with the accompanying drawings in which:

DETAILED DESCRIPTION

Figure 1:
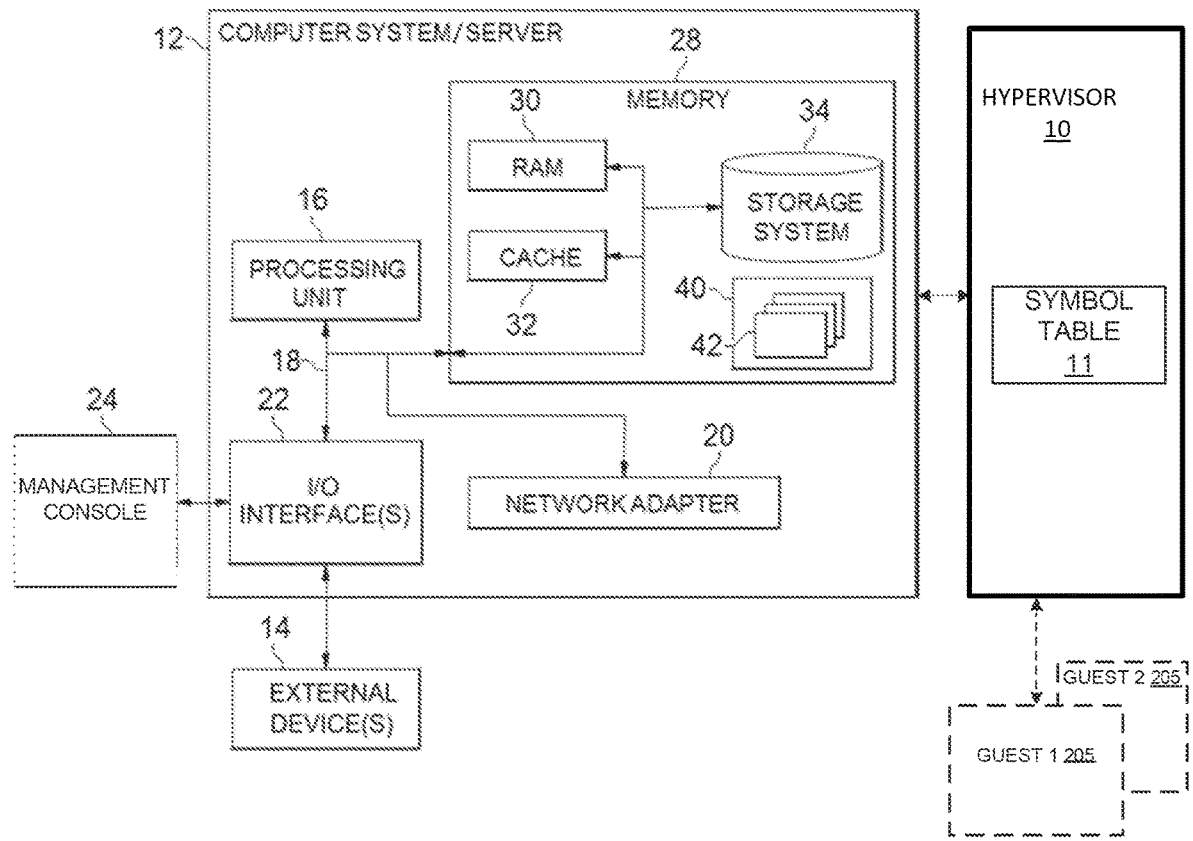
FIG. 1 is a functional block diagram of an illustrative system, according to an embodiment of the present invention.

The present disclosure relates generally to the field of virtualized computing environments. In a virtualized computing environment, a virtual machine, also referred to as a virtual guest, acts like a real computer with an operating system and hardware devices. As in a real computer, each virtual guest includes numerous files that configure the operation of the virtual guest. Such configuration information includes guest IP address, network configuration, DNS configuration, resolver configuration, and a wide variety of other system and application related configurations (LDAP, Docker, registry) that are unique to the specific virtual guest instance. These files are accessed and managed locally by the virtual guest and the applications on the virtual guest.

In a large-scale computing environment, these unique configuration files and common files are duplicated across the virtual guests and are managed separately. In current practice, a network share, such as Network File System (NFS) can export files containing configuration information to multiple systems. However, network shares operate on a directory level, and not on an individual file level or field level within the file. Network shares are also subject to the reliability and speed of the underlying network, and are difficult to secure because some data transfers may be sent in clear text by default.

Embodiments of the present invention provide a specialized symbol-based file system that allows configuration files to be managed locally in the host environment, so that the configuration files do not rely on the network to replicate them across multiple virtual guest instances. The locally protected interface between the virtual guest and the host is used to obtain and/or resolve values in the configuration files, thereby providing enhanced security and reliability because network access is not required. Also, the virtual guest is not subject to the limitations of the directory level share. The virtual guest accesses its configuration files and configuration parameters transparently. This means that when the configuration parameters in a configuration file are updated, the modifications are reflected in the virtual guest each time the configuration file is opened in the normal course of execution, without requiring downtime in the virtual guest. The use of symbolic links in the traditional file system permits a configuration file to be located in the symbol-based file system of the virtual guest. However, the symbol-based files are located under the mount point of the symbol-based file system. Similarly, through the symbol-based file system, configuration parameters can be shared globally to all virtual guests instantiated on a host, or can be customized to certain virtual guest(s) on the host. Additionally, the global sharing means that configuration files and configuration parameters for a large number of virtual guests can be centrally managed, a benefit in a cloud environment. Therefore, embodiments of the present invention tend to improve the technology of system management in a virtual guest environment, particularly as it applies to cloud implementations.

Embodiments of the invention will now be described in more detail in connection with the Figures.

FIG. 1 is a functional block diagram of an illustrative virtualized environment (system) 100, according to an embodiment of the invention.

As shown, the system 100 includes one or more computer system/servers (server) 12, one of which is shown. The server 12 may include any computer capable of including a hypervisor 10, which enables virtualizing the server 12 hardware to support one or more optional virtual guests, such as guest 1 205 and guest 2 205.

The functions and processes of server 12 may be described in the context of computer system-executable instructions, such as program modules, routines, objects, data structures, and logic, etc. that perform particular tasks or implement particular abstract data types. The server 12 can be part of a distributed cloud computing environment, and may enable creation of multiple virtual guests, when a hypervisor 10 is installed on the server 12.

As shown in FIG. 1, the server 12 may include, but is not limited to, one or more processors or processing units 16, a system memory 28, and a bus 18 that couples various system components including system memory 28 to processor 16.

Bus 18 represents one or more of several types of bus structures, including a memory bus or memory controller, a peripheral bus, an accelerated graphics port, and a processor or local bus using any of a variety of bus architectures.

The server 12 typically includes a variety of computer system readable media. Such media may be any available media that is accessible by computer system/server 12, and it includes both volatile and non-volatile media, removable and non-removable media.

The memory 28 can include computer system readable media in the form of volatile memory, such as random access memory (RAM) 30 and/or cache memory 32. The server 12 may further include other removable/non-removable, volatile/non-volatile computer system storage media. For example, storage system 34 can include a non-removable, non-volatile magnetic media, e.g., a "hard drive" and an optical disk drive for reading from or writing to a removable, non-volatile optical disk such as a CD-ROM, DVD-ROM or other optical media. Each device in the storage system 34 can be connected to bus 18 by one or more data media interfaces, such as I/O interface 22.

Each program 40 (one of which is shown) represents one of a plurality of programs that are stored in the storage system 34 and are loaded into the memory 28 for execution. A program 40 includes an instance of an operating system, an application, a system utility, or similar. Each program 40 includes one or more modules 42. The data of the symbol table 11 can be stored on storage system 34. Upon activation of the virtual guests, the hypervisor 10 can cause the data of the symbol table 11 to load into hypervisor 10 memory, where it is available to populate the configuration parameters of the virtual guests. It should be noted that even when the server 12 includes the hypervisor 10, virtual guests are optional. Other configurations are possible.

The server 12 may also communicate with one or more external devices 14 such as a keyboard, a pointing device; and/or any devices (e.g., network card, modem, etc.) that enable the server 12 to communicate with one or more other computing devices. Such communication can occur via Input/Output (I/O) interfaces 22.

The management console 24 includes specialized software to communicate with the hypervisor 10 component of the server 12 through the I/O interface 22 to manage the configuration and state of virtual guests. Using the management console 24 an administrator having the appropriate security authorization defines symbols and their corresponding substitution values that are the configuration values for the virtual guests. The symbols and their corresponding substitution values may be stored in the storage system 34 on the server 12. The defined symbols and their corresponding substitution values are stored in hypervisor 10 memory as the symbol table 11. Also upon activation, and as described further with reference to FIGS. 2-3, the symbol-based file system and the associated symbolic links are configured.

The server 12 can communicate with one or more networks via network adapter 20. As depicted, network adapter 20 communicates with the other components of the server 12 via bus 18. Although not shown, other hardware and/or software components could be used in conjunction with the server 12. Examples include, but are not limited to: microcode, device drivers, redundant processing units, external disk drive arrays, RAID systems, tape drives, and data archival storage systems. In the present invention, the server 12 can illustrate a physical hardware and software implementation. The server 12 can also illustrate a virtual implementation of a physical server, for example, a virtual machine or virtual guest.

Figure 2:
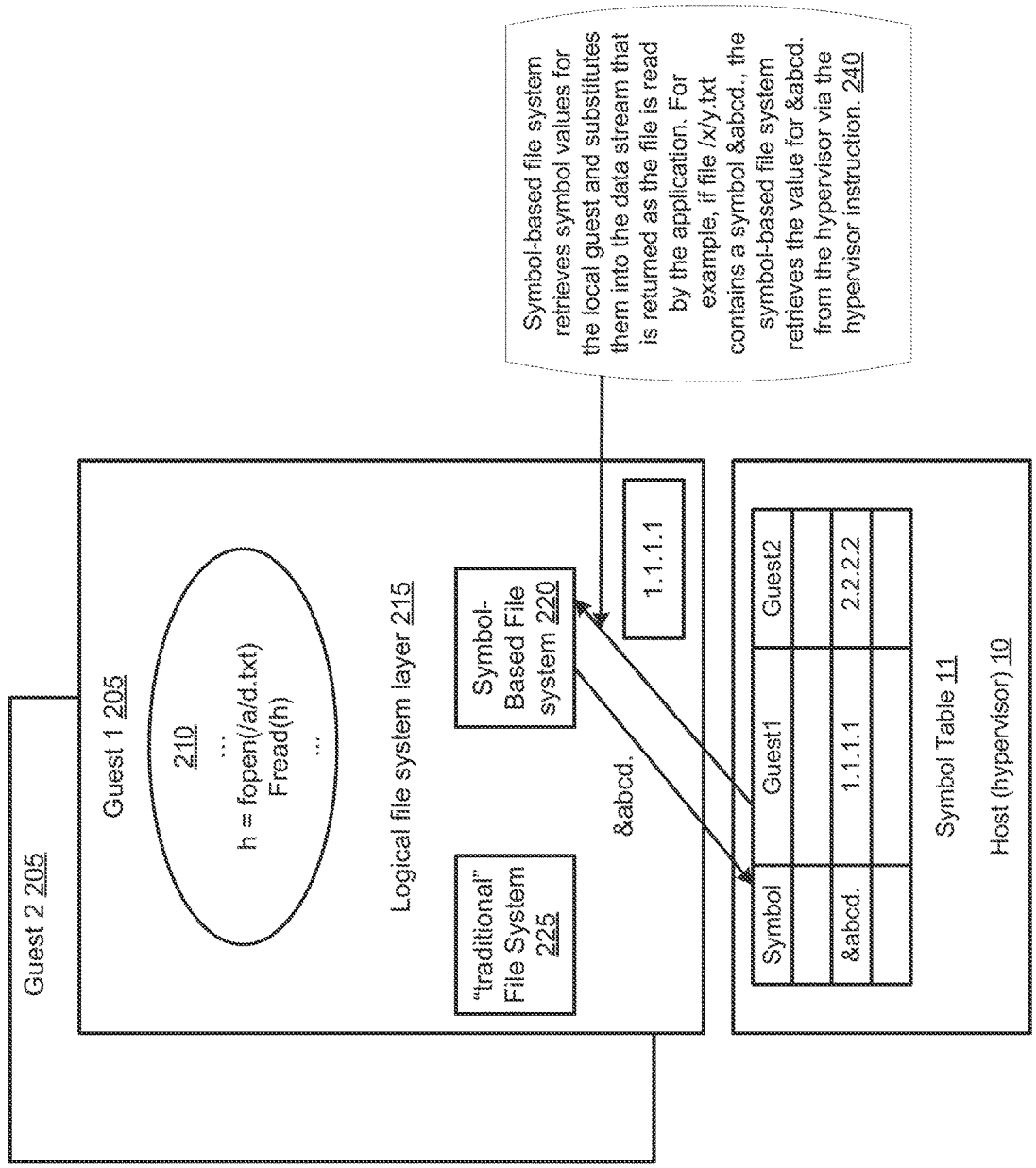
FIG. 2 illustrates a virtual guest instance with a symbol-based file system, according to an embodiment of the present invention.

FIG. 2 illustrates a virtual guest instance with a symbol-based file system, according to an embodiment of the present invention.

FIG. 2 shows two virtual guests (guests) 205, guest 1 and guest 2. Each guest 205 is instantiated on a physical server, such as server 12 of FIG. 1. Each guest 205 includes a logical file system layer 215. A logical file system presents file system data to the operating system of a guest 205 or a server 12 in a uniform manner despite the underlying physical storage devices having different data storage architectures. The hypervisor 10 on the server (host) 12 implements both a traditional file system 225 and a symbol-based file system 220 in each guest 205. A traditional file system may be referred to as one that stores and retrieves data to and from the underlying storage medium without an alteration to the cleartext value of the data. In contrast, the symbol-based file system 220 interprets each field of the stored data as it is read from the storage medium and replaces specially coded symbols with values that are dynamically retrieved from the symbol table 11 through the hypervisor 10. As shown in FIG. 2, the hypervisor 10 stores and manages a symbol table 11, organized by guest 205. The symbol table 11 includes a symbol, here "&abcd.", which is present in the guest 205 file 210, and the substitution value, here "1.1.1.1" for guest 1 and "2.2.2.2" for guest 2. This example shows that even if files on different virtual guests include the same symbol, the symbol can have a different substitution value because the symbols are organized by virtual guest. As shown in 240, the symbol-based file system 220 intercepts system calls from an application or the operating system to open a file 210 that contains symbols. In turn, the symbol-based file system retrieves the symbol value from the hypervisor 10 through a privileged call to the hypervisor 10. The substitution value for each symbol is returned to the caller in the virtual guest.

Figure 3:
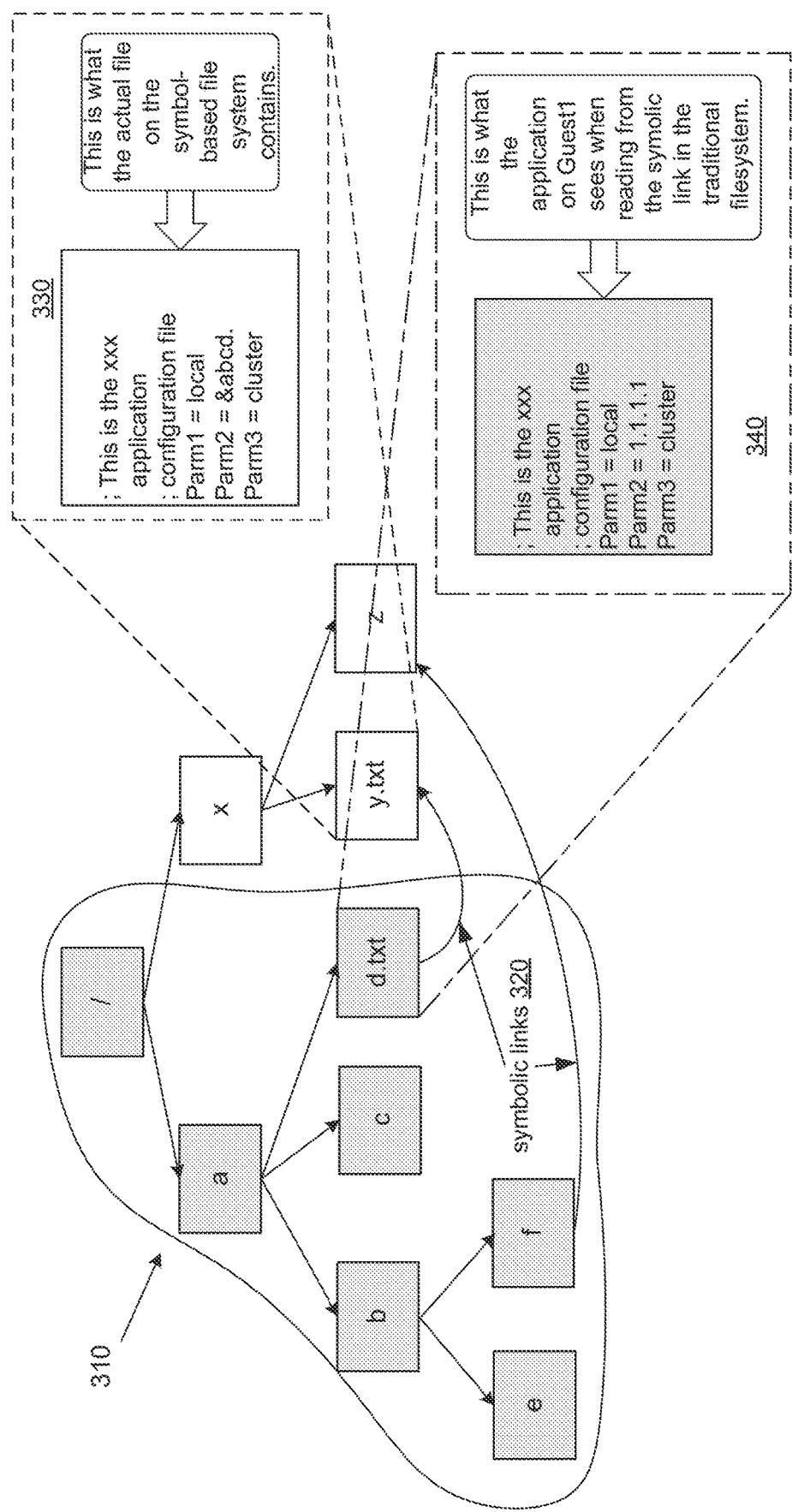
FIG. 3 illustrates the relationship between the traditional file system and the symbol-based file system, according to an embodiment of the present invention.

FIG. 3 illustrates the relationship between the traditional file system 225 and the symbol-based file system 220, according to an embodiment of the present invention.

The file trees, shown as 310, represent the actual locations of files and symbolic links in a traditional file system 225. These files include system configuration files such as "/etc/hosts" and "/etc/resolv.conf". However, the files can include other types of files, such as application configuration files. The location of files is not limited to the "/etc" directory. The files "x", "y.txt", and "z" are files stored in the symbol-based file system 220. As shown by 330, the files on the symbol-based file system 220 include the parameters that are needed for the application or operating system. Some of the parameters may be explicitly included, such as "Parm1=local", but some parameters may be symbols, such as "Parm2=&abcd.". Elements 340 illustrate the resulting view of the file after symbol resolution as the is read through the symbolic link in the traditional file system. For example, "Parm2=&abcd." is now resolved as "Parm2=1.1.1.1". Each symbolic link in the traditional file system 225 is located where the application or operating system expects, and appears to contain actual values for the parameters. Therefore, the symbols and the substitution process is transparent to the application/operating system.

FIG. 3 shows two symbolic links 320. Symbolic links 320 are created in the traditional file system 225 to reference the appropriate files in the symbol-based file system 220. When the application/operating system issues a system call to open one of the symbolic links 320, the call is redirected to the symbol-based file system 220 that manages the linked file. As the linked symbol-based file is read from storage into memory, the symbol-based file system 220 examines the contents field by field to identify embedded symbols. For each identified symbol, the hypervisor 10 is called via a privileged instruction, the format and contents of which are dependent upon the architectural implementation. The privileged instruction includes metadata operands to uniquely identify which guest 205 entry to retrieve from the symbol table 11. Upon locating the uniquely identified guest 205 entry, the hypervisor 10 returns the resolution values to the symbol-based file system which replaces the symbol with the resolved value in memory. Any subsequent call to read the contents of the opened symbolic link returns the resolved contents to the application/operating system caller.

It should be noted that an administrator having appropriate security authorization can maintain (add/update/delete) the symbol table 11 while the guests 205 are active. In that case, the next call to open a file, will cause the initialization process described above to execute again so that the symbols are refreshed, except that the existing symbolic link may be used.

Figure 4:
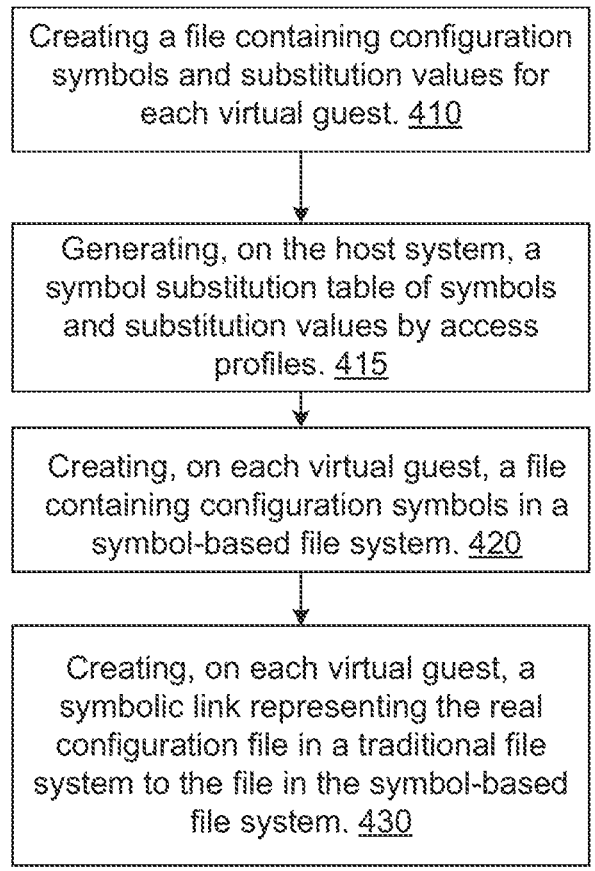
FIG. 4 is a flow of initializing the symbol-based file system, according to an embodiment of the present invention.

FIG. 4 is a flow of initializing the symbol-based file system, according to an embodiment of the present invention.

At 410, the specialized software of the management console 24 receives as input configuration symbols and their corresponding substitution values. Each virtual guest is associated with a unique profile that includes, among other data, a unique identifier and a user identity that is authorized to start and administer the virtual guest. Depending on the virtualization implementation, additional data can be associated with the unique profile, such as a unique jobname and unique process identifier.

At 415, the hypervisor 10 on the host system (server 12) generates a symbol table 11 in hypervisor 10 memory, with corresponding substitution values. The symbol table 11 can be organized as a hash table that is used together with the guest profiles to indicates how each symbol definition is resolved. The symbol table 11 is persisted to system storage 34 to avoid having to re-enter the symbol table 11 each time the system starts. The persisted format could be a simple file, table, or set of tables in a relational database, or any other suitable representation.

At 420, the hypervisor 10 creates a file containing configuration symbols in the symbol-based file system on each virtual guest. This created file may be located anywhere in the symbol-based file system.

At 430, a symbolic link is created from the file location in the traditional file system 225 to the created file in the symbol-based file system 220. The file location in the traditional file system is where the operating system or application expects the file to be, such as "/etc" for the DNS "resolv.conf". The symbolic link creation may be automated, or be manually executed by an administrator having the appropriate authority.

Figure 5:
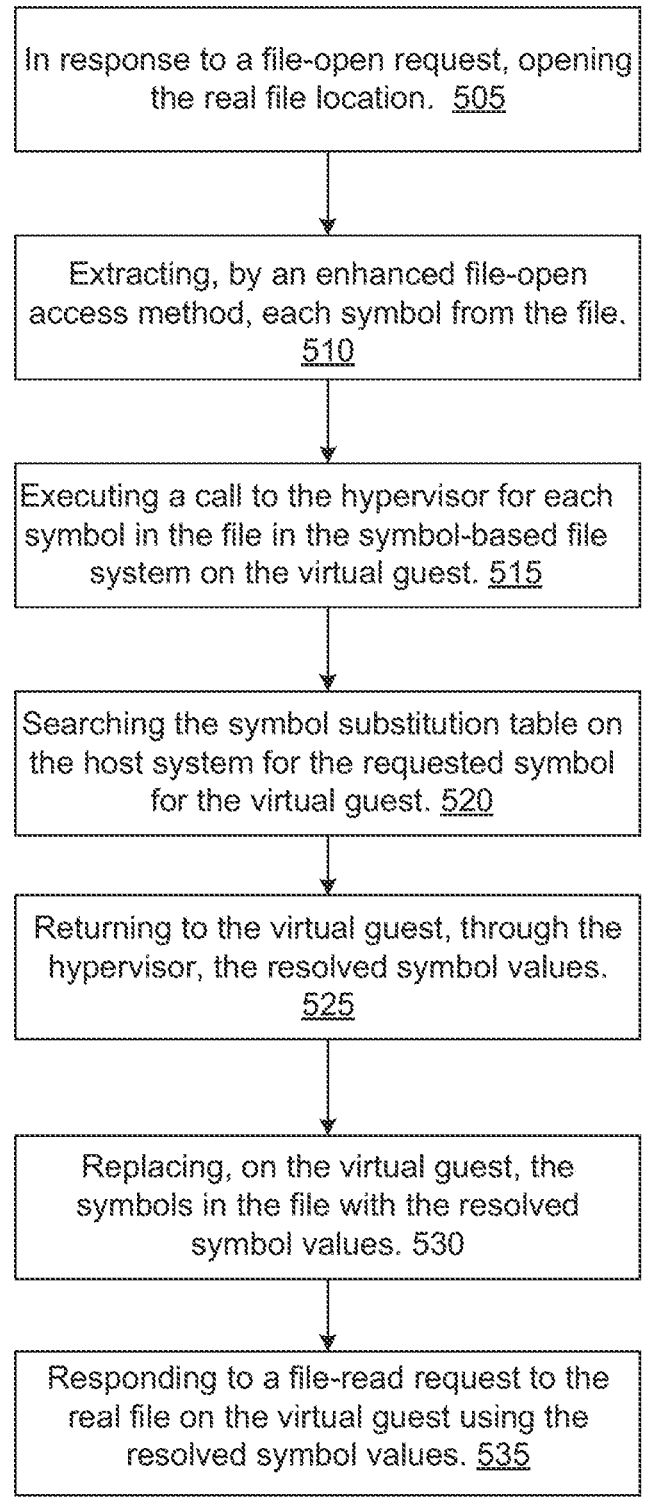
FIG. 5 is flow of resolving symbols in the virtual guest instance, according to an embodiment of the present invention.

FIG. 5 is flow of resolving symbols in the virtual guest instance, according to an embodiment of the present invention.

At 505, the operating system or an application issues a request to open a configuration file at the expected location, for example, "/etc/resolv.conf". The request is issued using known file system access methods, such as "fopen".

At 510, the file system access method, e.g., "fopen", opens "/etc/resolv.conf". When the "fopen" opens the symbolic link, the request is forwarded to the symbol-based file system 220.

At 515, for each symbol, the "fopen" in the symbol-based file system executes a privileged instruction to the hypervisor 10 to retrieve the corresponding substitution value for the caller in the particular guest 205.

At 520, the hypervisor 10 searches the symbol table 11, based on the unique profile for the virtual guest that is accessing the file.

At 525, the hypervisor 10 performs the symbol substitution, and the substitution value is returned to the virtual guest.

At 530, the symbolic substitutions are completed, and the "fopen" processing ends. The symbolic substitutions are in memory and are not persistent.

At 535, the caller of the "fopen", for example to open "/etc/resolv.conf", receives an indication from the "fopen" processing that the file is successfully opened. In this case, subsequent read operations return the substitution values.

It should be noted that an administrator can modify the symbols and substitution values without disrupting the operation of the virtual guest or the operating system. In this case, the substitution values are refreshed in the virtual guest each time the file is opened.

Various embodiments of the invention may be implemented in a data processing system suitable for storing and/or executing program code that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although preferred embodiments have been depicted and described in detail herein, it will be apparent to those skilled in the relevant art that various modifications, additions, substitutions and the like can be made without departing from the spirit of the disclosure, and these are, therefore, considered to be within the scope of the disclosure, as defined in the following claims.

What is claimed is:

1. A method, comprising:
   generating in hypervisor storage on a host system, a symbol table, wherein the symbol table includes symbols and their substitution values for each virtual guest that is defined on the host system;
   creating on each virtual guest a symbolic link in a traditional file system to a symbol-based file in a symbol-based file system;
   inserting into each symbol-based file, parameters and their corresponding substitution values;
   opening the symbolic link located in the traditional file system in a virtual guest;
   extracting each symbol from the symbol-based file, wherein the symbol-based file is located in the symbol-based file system, and wherein the symbol-based file is accessed through the symbolic link in the traditional file system;
   executing a privileged call from the virtual guest to a hypervisor for each symbol in the symbol-based file to retrieve a substitution value from the symbol table, wherein the symbol table is stored in hypervisor storage;
   returning to the virtual guest the substitution value for each symbol, wherein the substitution value replaces the symbol in the symbol-based file; and
   in response to a file read request from the virtual guest for a real file in the traditional file system, retrieving the substitution value from the symbol-based file using the symbolic link from the real file.

2. The method of claim 1, wherein the symbol table is a hash table.

3. The method of claim 1, wherein the symbol table is organized by a virtual guest profile, wherein the symbol table includes the symbols and the resolution values for each virtual guest on the host system, and wherein the virtual guest profile includes metadata to unique identify each virtual guest.

4. The method of claim 1, wherein modifications to the symbol table are non-disruptive and are transparent to an active virtual guest.

5. The method of claim 1, wherein the symbol is not unique in the symbol table.

6. The method of claim 1, wherein in the virtual guest, the symbol is included in more than one different symbol-based file, or wherein the symbol is included more than once in a same symbol-based file.

7. A computer program product, the computer program product comprising a non-transitory tangible storage device having program code embodied therewith, the program code executable by a processor of a computer to perform a method, the method comprising:
   generating in hypervisor storage on a host system, a symbol table, wherein the symbol table includes symbols and their substitution values for each virtual guest that is defined on the host system;
   creating on each virtual guest a symbolic link in a traditional file system to a symbol-based file in a symbol-based file system; and
   inserting into each symbol-based file, parameters and their corresponding substitution values;
   opening the symbolic link in the traditional file system in a virtual guest;
   extracting each symbol from the symbol-based file, wherein the symbol-based file is located in a symbol-based file system, and wherein the symbol-based file is accessed through the symbolic link in the traditional file system;
   executing a privileged call from the virtual guest to a hypervisor for each symbol in the symbol-based file to retrieve a substitution value from the symbol table, wherein the symbol table is stored in hypervisor storage;
   returning to the virtual guest the substitution value for each symbol, wherein the substitution value replaces the symbol in the symbol-based file; and
   in response to a file read request from the virtual guest for a real file in the traditional file system, retrieving the substitution value from the symbol-based file using the symbolic link from the real file.

8. The computer program product of claim 7, wherein the symbol table is a hash table.

9. The computer program product of claim 7, wherein the symbol table is organized by a virtual guest profile, wherein the symbol table includes the symbols and the resolution values for each virtual guest on the host system, and wherein the virtual guest profile includes metadata to uniquely identify each virtual guest.

10. The computer program product of claim 7, wherein modifications to the symbol table are non-disruptive and are transparent to an active virtual guest.

11. The computer program product of claim 7, wherein the symbol is not unique in the symbol table.

12. The computer program product of claim 7, wherein in the virtual guest, the symbol is included in more than one different symbol-based file, or wherein the symbol is included more than once in a same symbol-based file.

13. A computer system, comprising:
    one or more processors;
    a memory coupled to at least one of the processors;
    a set of computer program instructions stored in the memory and executed by at least one of the processors in order to perform actions of:
       generating in hypervisor storage on a host system, a symbol table, wherein the symbol table includes symbols and their substitution values for each virtual guest that is defined on the host system;
       creating on each virtual guest a symbolic link in a traditional file system to a symbol-based file in a symbol-based file system; and
       inserting into each symbol-based file, parameters and their corresponding substitution values;
       opening the symbolic link in the traditional file system in a virtual guest;
       extracting each symbol from the symbol-based file, wherein the symbol-based file is located in the symbol-based file system, and wherein the symbol-based file is accessed through the symbolic link from a real file;
       executing a privileged call from the virtual guest to a hypervisor for each symbol in the symbol-based file to retrieve a substitution value from the symbol table, wherein the symbol table is stored in hypervisor storage;
       returning to the virtual guest the substitution value for each symbol, wherein the substitution value replaces the symbol in the symbol-based file; and
       in response to a file read request from the virtual guest for the real file in the traditional file system, retrieving the substitution value from the symbol-based file using the symbolic link from the real file.

14. The computer system of claim 13, wherein the symbol table is a hash table.

15. The computer system of claim 13, wherein the symbol table is organized by a virtual guest profile, wherein the symbol table includes the symbols and the resolution values for each virtual guest on the host system, and wherein the virtual guest profile includes metadata to unique identify each virtual guest.

16. The computer system of claim 13, wherein modifications to the symbol table are non-disruptive and are transparent to an active virtual guest.

17. The computer system of claim 13, wherein in the virtual guest, the symbol is included in more than one different symbol-based file, or wherein the symbol is included more than once in a same symbol-based file.

* * * * *